(12) United States Patent  
Ali

(10) Patent No.: US 7,397,164 B1
(45) Date of Patent: Jul. 8, 2008

(54) SUBSTANTIALLY NOISELESS COOLING DEVICE FOR ELECTRONIC DEVICES

(75) Inventor: Ihab A. Ali, San Jose, CA (US)

(73) Assignee: Apple Inc., Cupertino, CA (US)

( * ) Notice: Subject to any disclaimer, the term of this patent is extended or adjusted under 35 U.S.C. 154(b) by 150 days.

(21) Appl. No.: 10/912,788

(22) Filed: Aug. 6, 2004

(51) Int. Cl.
  *H01L 41/04* (2006.01)
(52) U.S. Cl. .................. 310/311; 361/690; 361/695
(58) Field of Classification Search ........... 361/690, 361/695, 395; 310/311
  See application file for complete search history.

(56) References Cited

U.S. PATENT DOCUMENTS

| 4,753,579 | A | * | 6/1988 | Murphy ............... 417/410.2 |
| 4,780,062 | A | * | 10/1988 | Yamada et al. ......... 417/410.2 |
| 4,923,000 | A | * | 5/1990 | Nelson .................. 165/122 |
| 5,008,582 | A | * | 4/1991 | Tanuma et al. ............ 310/332 |
| 6,659,740 | B2 | * | 12/2003 | Drevet ................. 417/436 |
| 6,937,472 | B2 | * | 8/2005 | Pokhama .............. 361/700 |
| 2003/0177899 | A1 | * | 9/2003 | Monson et al. .......... 92/98 R |
| 2004/0207292 | A1 | * | 10/2004 | Scher et al. ............ 310/328 |

FOREIGN PATENT DOCUMENTS

| EP | 1515043 A1 | * | 3/2005 |
| JP | 2001355574 A | * | 12/2001 |
| JP | 2002134975 A | * | 5/2002 |

* cited by examiner

*Primary Examiner*—Jaydi A San Martin
(74) *Attorney, Agent, or Firm*—Blakely, Sokoloff, Taylor & Zafman LLP

(57) ABSTRACT

A cooling device of an electronic component. The cooling device comprises a carrier having one or more openings, a piezoelectric member moveably disposed in one of the openings, a plurality of conductive wires disposed within the carrier and extending into the openings, wherein one or more conductive wires being coupled to the piezoelectric member, and an interconnecting member connecting the conductive wires to a power source, wherein when power is supplied, the piezoelectric member vibrates to circulate air and dissipate heat.

36 Claims, 9 Drawing Sheets

SUBSTANTIALLY NOISELESS COOLING DEVICE FOR ELECTRONIC DEVICES

BACKGROUND

Aspects of the present invention pertains to a substantially noiseless cooling device for cooling electronic devices such as a hard drive, an optical device, a battery, a central processing unit (CPU) or other integrated circuit device of a computer (or an enclosure skin of a system) and more particularly, of a notebook computer.

Advances continue to be made in the manufacture of solid-state electronic devices, resulting in increasing functionality, density, and performance of the integrated circuits (ICs). The amount of heat generated, and accordingly the amount of power needed to be dissipated, by modern integrated circuits generally increases with increases in the density and speed of the circuits. Removal of heat produced by the integrated circuits therefore continues to be of significant concern of modern integrated circuit package and system designers, considering the loss of performance and the degradation in reliability of integrated circuits when operated at elevated temperatures.

In addition, the trend toward more compact electronic systems is also continuing, exacerbating the thermal problem produced by the high-complexity and high-performance integrated circuits. For example, laptop or notebook sized computers have recently become quite popular, with continuing market pressure toward even smaller computer systems such as personal digital assistants (PDA). However, these small computer systems eliminate many of the traditional techniques for heat removal available for large-scale computer systems, such as the use of fans for convection cooling of the integrated circuits. As such, many modern computer systems utilize thermal conduction as the primary mode of heat removal from the integrated circuits in the computer system.

Many methods and apparatuses have been developed to remove heat from heat generating components located within the confines of a computer system enclosure. One method includes a simple attachment of a finned heat sink to the top surface of the device. Another method includes using finned heat sinks having integral fans. Another method includes the use of large, flat heat spreading plates attached directly or indirectly to the device to be cooled off. Many methods involves coupling the heat spreading plate to a heat pipe or other low resistance thermal path.

Although various methods or apparatuses have shown sufficient in the past, they do not provide the heat removal capacity and/or efficiency needed to cool current and future high-performance microprocessors or electronic devices included in computer systems, especially portable computer systems or other thin profile electronic devices. For example, because of the density of electronics inside a notebook computer, a number of strategies (e.g., heat pipes, radiator fins, and fans) have been used to provide adequate cooling to the components inside such computer. However, at least for some models of the notebook computer, the lower surface of the computer becomes quite hot during operation. If adequate ventilation to the devices are not provided, overheating of the internal components may result along with possible malfunction. Also, inadequate ventilation may cause discomfort to user using such notebook computer due to the overheating factor.

As processors and power devices get faster and hotter, and as package densities increase, the need for reliable, effective, and efficient thermal management devices become crucial. Thus, there is a need for a heat-dissipating device that can dissipate heat generated from an IC, ICs, or IC containing electronic devices.

SUMMARY

In accordance to embodiments of the present invention, a cooling device is provided. The cooling device utilizes piezoelectric components, which can vibrate when power is supplied. The piezoelectric components are configured so that they vibrate at a non-audible frequency in the infrasonic or ultrasonic range and so that they vibrate with a substantially small magnitude in the order of sub-millimeter, or that they vibrate with a magnitude less than or equal to about 1 mm. The piezoelectric components configured as such allowed the cooling device to be placed in a confined and small space and still effectively create air circulation to cool particular electronic devices. Additionally, piezoelectric components configured as such allowed the cooling device to operate as a substantially "noiseless" cooling device since the piezoelectric components vibrate at a non-audible frequency.

One aspect of the invention pertains to a cooling device that comprises a carrier having one or more openings, a piezoelectric member moveably disposed in one of the openings, a plurality of conductive wires disposed within the carrier and extending into the openings, wherein one or more conductive wires being coupled to the piezoelectric member, and an interconnecting member connecting the conductive wires to a power source, wherein when power is supplied, the piezoelectric member vibrates to circulate air and dissipate heat.

One aspect of the invention pertains to a computer system that comprises an electronic component disposed within an enclosure case of the computer system and a cooling device placed over a surface of the electronic component of the computer system. The cooling device comprises a carrier having a plurality of openings, a plurality of piezoelectric members each moveably disposed in one of the openings of the carrier, a plurality of conductive wires disposed within the carrier and extending into the openings, wherein the plurality of conductive wires coupling to the plurality of piezoelectric members, and an interconnecting member connecting the plurality of conductive wires to a power source. When power is supplied, the piezoelectric members vibrate to dissipate heat generated by the electronic component.

Another aspect of the invention pertains to a method to dissipate heat from an electronic component that comprises placing a carrier having a plurality of piezoelectric members disposed therein over a surface of the electronic component where heat is generated. The piezoelectric members are connected through a plurality of conductive wires disposed through the carrier and wherein the piezoelectric members are configured to vibrate when power is supplied to the piezoelectric members. The method further comprises supplying power to the piezoelectric members to cause in air jet impingement that impinges on the surface of the electronic component to circulate air.

DETAILED DESCRIPTION

Figure 1:
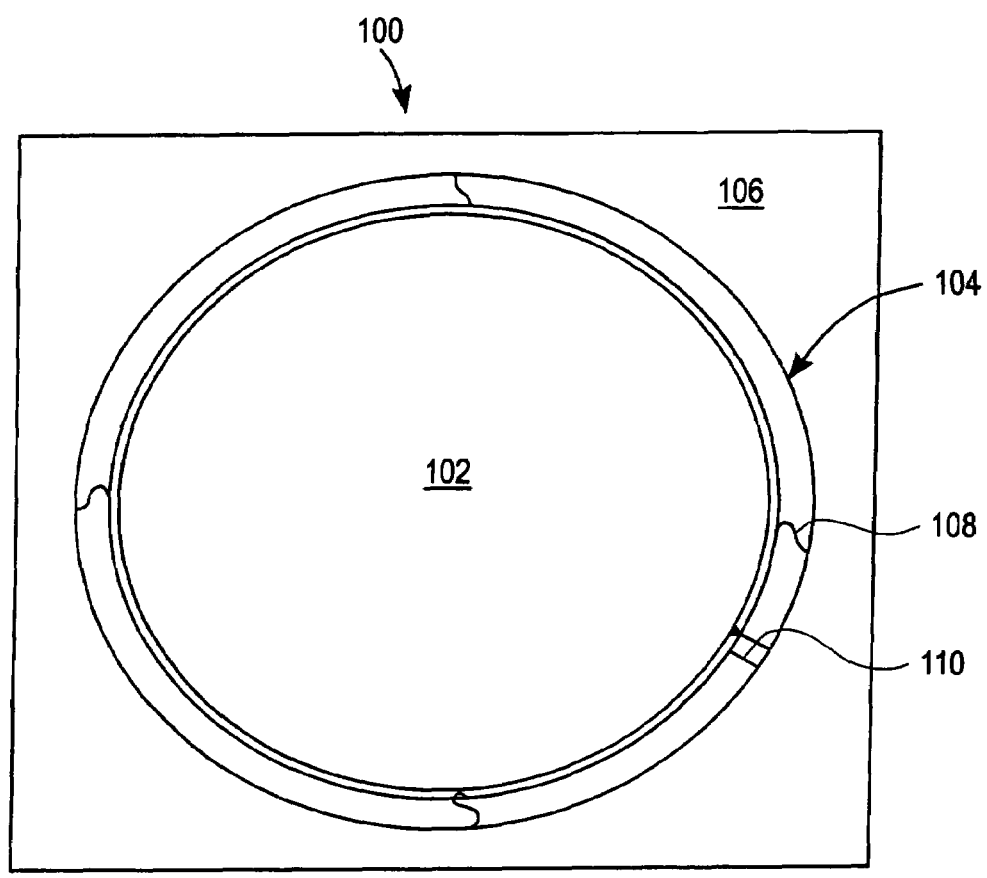
FIG. 1 illustrates an exemplary cooling device in accordance to embodiments of the present invention.

Exemplary embodiments are described with reference to specific configurations and techniques pertaining to an apparatus and method for removing heat from a heat generating component located within an electronic or computer system enclosure is described. In the following description, numerous specific details are set forth such as material types, dimensions, processing steps, etc., in order to provide a thorough understanding of the present invention. However, it will be obvious to one of skill in the art that the invention may be practiced without these specific details. In other instances, well known elements and processing techniques have not been shown in particular detail in order to avoid unnecessarily obscuring the present invention. In order to illustrate the need for cooling systems that are capable of being integrated within an enclosure especially one having limited available space, this discussion will mainly be limited to those needs associated with removing heat from integrated circuits housed within portable computers, such as notebook and laptop computers. It will be recognized, however, that such focus is for descriptive purposes only and that the apparatus and methods of the present invention are applicable to other thin profile or small form factor electronic devices. Those of ordinary skill in the art will appreciate the various changes and modifications to be made while remaining within the scope of the appended claims. Additionally, well known elements, devices, components, circuits, process steps and the like are not set forth in detail.

Embodiments of the present invention pertain to a substantially noiseless cooling device for cooling electronic devices such as a hard drive, an optical device, a battery, a central processing unit (CPU) or other integrated circuit devices of an electronic device, a computer system and more particularly, of a laptop or notebook computer.

In accordance to embodiments of the present invention, a cooling device is provided. The cooling device utilizes piezoelectric components, which can vibrate when power is supplied. The piezoelectric components are configured so that they vibrate at a non-audible frequency in the infrasonic or ultrasonic range and so that they vibrate with a substantially small magnitude in the order of sub-millimeter, or that they vibrate with a magnitude less than or equal to about 1 mm. The piezoelectric components configured as such allowed the cooling device to be placed in a confined and small space and still effectively create air circulation to cool particular electronic devices. Additionally, piezoelectric components configured as such allowed the cooling device to operate as a substantially "noiseless" cooling device since the piezoelectric components vibrate at a non-audible frequency. The cooling device of the embodiments of the present invention can be used to place over a particular electronic device that generates heat to create or generate air circulation over the particular electronic device to dissipate the heat. Throughout this discussion, the use of the term "particular electronic device" may refer to a wide range of electronic devices such as a battery, a battery compartment memory module access door, a hard disk drive, an optical drive, a graphic card controller, a central processing unit, an integrated circuits or other devices disposed in a computer system or other like machines.

FIG. 1 illustrates an exemplary cooling device 100, which includes a piezoelectric member 102 disposed within an opening 104 of a carrier 106. The piezoelectric member 102 is electrically actuated. The piezoelectric member 102 comprises an element that when subjected to an electrical energy can convert such energy into a mechanical energy represented by vibration. Thus, the piezoelectric member 102 can be connected to an electrical current or electrical charge, which when so connected, will vibrate. The vibration of the piezoelectric member 102 causes air to circulate thus, cooling down the electronic device that the cooling device 100 is placed over. In one embodiment, when electrical energy is supplied to the piezoelectric member 102, the piezoelectric member 102 creates an air jet impingement that impinges on the surface of the particular electrical device that the cooling device 100 is placed over so that air will be circulated. Additionally, negative pressure can be created so that more air is drawn in or across the cooling device 100 to dissipate heat for the particular electronic device. When the piezoelectric member 102 vibrates or actuates, there is thus an air turbulence created over the surface of the particular electronic device to dissipate heat from such device.

The piezoelectric member 102 can be made of ceramics (such as silicon nitride ($Si_3N_4$), boron carbide ($B_4C$), silicon carbide (SiC), magnesium diboride ($MgB_2$), zinc oxide (ZnO), and ferrite ($Fe_3O_4$)), quartz crystals, quartz analogue crystals (such as berlinite ($AlPO_4$) and gallium orthophosphate ($GaPO_4$)), ceramics with perovskite (lime titanate mineral) or tungsten-bronze structures (such as $BaTiO_3$, $KNbO_3$, $LiNbO_3$, $LiTaO_3$, $BiFeO_3$, $Na_xWO_3$, $Ba_2NaNb_5O_5$, $Pb_2KNb_5O_{15}$), and certain polymers such as polyvinlidene fluoride, $(-CH_2-CF_2-)_n$, rubber, and wood.

The piezoelectric member 102 can have various shape and size depending on application or depending on the electronic component that the cooling device 100 is adapted to dissipate heat. The piezoelectric member 102 can be a disc, a strip, or a beam, each having a circular shape, a rectangular shape, a square shape, an oval shape, or other suitable shape. In one embodiment, the piezoelectric member 102 has a shape that is similar to the shape of the opening 104. As shown in FIG. 1, the piezoelectric member 102 is a circular disc and the opening 104 has a circular shape of similar parameter as the piezoelectric member 102. In one embodiment, the piezoelectric member 102 has a size of a dime. In some embodiment, the piezoelectric member 102 has a circular shape and has a diameter ranging from about 0.5 cm to about 2.5 cm. The piezoelectric member 102 may have a thickness less than or equal to about 1 mm. Other sizes and shapes could also be possible without departing from the scope of the embodiments of the present invention.

In the present embodiment, the opening 104 also has a size similar to the size of a dime. The piezoelectric member 102 and the opening 104 can be sized to be very close to each other or not so close to each other. A gap 110 is created between the piezoelectric member 102 and the opening 104. The gap 110 contributes to the air space provide for heat generated from a particular electronic device to dissipate as the piezoelectric member 102 is actuated or vibrated. In generally, the larger the gap 110, the more heat is able to dissipate into the surrounding area. In one embodiment, the gap 110 has a length of about 1 mm to about 10 mm.

The dimension and material of the piezoelectric member 102 dictates the frequency that the piezoelectric member 102 will vibrate. The size, thickness, and shape as well as the material of the piezoelectric member 102 all controls to the frequency of the piezoelectric member 102 vibration. The piezoelectric member 102 is thus configured so that the piezoelectric member 102 can vibrate within a non-audible frequency, either in infrasonic (below audible range) or ultrasonic range (above audible range). Because the piezoelectric member 102 is configured to vibrate or actuate within the non-audible frequency, the cooling device 100 can operate as a "noiseless fan" or a "noiseless cooling device" to dissipate heat for a particular electronic device.

Within the ultrasonic range, the piezoelectric member 102's magnitude of vibration is small. The piezoelectric member 102 can vibrate with a magnitude of about 1 mm or less. The piezoelectric member 102 thus can actuate with a magnitude of about 1 mm or less, and in some embodiment, the piezoelectric member 102 actuates at a magnitude at the micron levels. With such a small magnitude of vibration, the motion, vibration, or actuation of the piezoelectric member 102 may not necessarily be visible. Further, with such a small magnitude of vibration, the piezoelectric member 102 can be sandwiched in a very small space (e.g., about 1-2 mm or less) and still function efficiently in a noiseless fashion to create air flow to dissipate heat for the particular electronic device.

Within the infrasonic range, the piezoelectric member 102's magnitude of vibration is still small but may be slightly larger than that of the ultrasonic range. In one embodiment, at the infrasonic range, the piezoelectric member 102 vibrates with a magnitude of 1 mm or more, or alternatively, a magnitude of about 1-3 mm. The piezoelectric member 102 operating in the infrasonic range still produces a noiseless vibration and still can be sandwiched within a very small space.

The frequency of the piezoelectric member 102 can be chosen to accommodate the space available for the cooling device 100 to dissipate heat from a particular electronic device. For instance, when only a small space (e.g., about 1-2 mm or less) is available, as is typical in a notebook or a laptop computer system, the piezoelectric member 102 could be configured to operate in the ultrasonic range so that the piezoelectric member 102 can vibrate or actuate with a small magnitude. When a larger space (e.g., about 1-2 mm or more) is available, the piezoelectric member 102 could be configured to operate in the infrasonic range (or alternatively, ultrasonic range) so that the piezoelectric member 102 can vibrate or actuate with an appropriate magnitude.

The electrical energy supplied to the piezoelectric member 102 contributes minutely or minimally to the frequency of the vibration thus can be of a wide range of power. In one embodiment, an electrical energy of about 10-100 milli-watts is used to supply currents or charges to the piezoelectric member 102 sufficiently to cause the piezoelectric member 102 to actuate or vibrate. The electrical energy for the cooling device 100 can be easily obtained from a convenient source such as a power supply component in a computer system.

In one embodiment, the piezoelectric member 102 is moveably disposed within the opening 104 such that when the electrical energy is applied, the piezoelectric member 102 can vibrate or actuate up and down in a vertical direction or in a perpendicular direction relative to the plane of the carrier 106. In one embodiment, the piezoelectric member 102 is held in the opening by a plurality of conductive wires 108 which also act as strain relief wires. The wires 108 enable electrical energy in the form of current or charge to be delivered to the piezoelectric member 102. The wires 108 also allow the piezoelectric member 102 to be moveably held in the openings 104 while being able to actuate as a result of the electrical energy.

Still with FIG. 1, in one embodiment, the plurality of conductive wires 108 are placed within the carrier 106 and extending out into the opening 104 so that they can be coupled to the piezoelectric member 102. One or more of the conductive wires 108 can be coupled to the piezoelectric member 102 by various techniques. In one embodiment, the conductive wires 108 are placed in openings (not shown) created into the piezoelectric member 102 and sealed (e.g., using adhesive) to create the coupling of the conductive wires 108 to the piezoelectric member 102.

Figure 2:
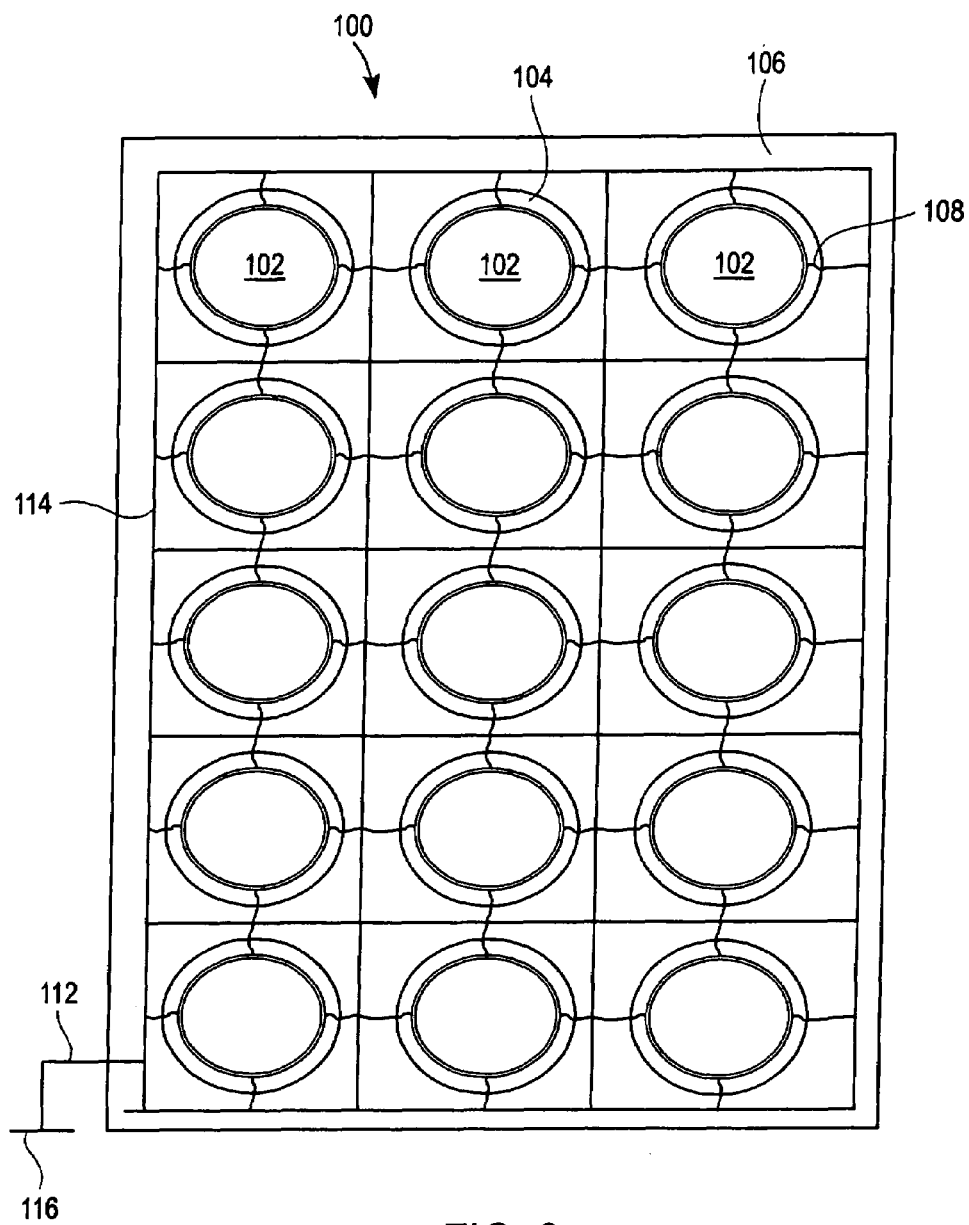
FIG. 2 illustrates another exemplary cooling device in accordance to embodiments of the present invention.

In FIG. 2, the cooling device 100 is configured to include more than one piezoelectric member 102. As shown in FIG. 2, the cooling device 100 includes a plurality of piezoelectric members 102 placed in the carrier 106. A plurality of piezoelectric members 102 is typically more preferable than one single piezoelectric member 102 since more air circulation can be generated. In this embodiment, the carrier 106 includes a plurality of openings 104 and one piezoelectric member 102 is placed within each opening 104. Similar to previously described, a plurality of conductive wires 108 are disposed within the carrier 106 and extending out of the openings 104 to couple to each of the piezoelectric members 102.

In one embodiment, the conductive wires 108 are interconnected serially and the piezoelectric members 102 are charged with an electrical current, also, serially. An interconnecting member or wire 112 is connected to the conductive wires 108 serially through a grid line 114. Electrical current can thus be supplied to the piezoelectric members 102 through the interconnecting member 112, the grid line 114, and the plurality of conductive wires 108. A power source 116 is coupled to the interconnecting member 112 to transmit the electrical current to the piezoelectric members 102. In one embodiment, the power source 116 is capable of transmitting a lower power of about 10-100 milli watts to the piezoelectric members 102. In one embodiment, the power source is a power supply of the particular electronic device that the cooling device 100 is placed over to dissipate heat generated by the electronic device. In one embodiment, the power source is the power source installed in a computer system within which the particular electronic device resides. In another embodiment, the cooling device 100 is connected to a main logic board or a printed circuit board of a computer system within which the particular electronic device resides in order for the main logic board or the printed circuit board to supply the low power into the cooling device 100.

In one embodiment, the carrier 106 is a rigid member, preferably made of a plastic material. Other suitable material can also be used. The carrier 106 is rigid to allow the piezoelectric members 102 to actuate or vibrate more efficiently to generate air over the particular electronic device. Additionally, the carrier 106 is made of a non-conductive material or alternatively, is conductively isolated form the plurality of conductive wires 108. The carrier 106 may have a thickness similar to the space (or the height of the space) allowed for the cooling device 100. In one embodiment, the carrier 106 has a thickness of about 1-2 mm. In other embodiment, the carrier 106 has a thickness less than 2 mm. It is to be understood that the carrier 106 can easily be made thicker than 2 mm in certain embodiments where there are more space allowed for the cooling device 100. In one embodiment, the carrier 106 has a thickness similar to the thickness of the piezoelectric members 102 (e.g., about 1-2 mm). In one embodiment, the plurality of conductive wires 108 are placed within the body of the carrier 106 (e.g., a grid of conductive wires are assembled in a mesh form prior to the formation of the carrier 106 wherein the material to form the carrier 106 is poured over the assembled conductive wires to form the carrier 106 having the plurality of conductive wires 108 embedded therein. The openings 104 are created in the carrier 106. The conductive wires 108 extended into the openings 104. The piezoelectric members 102 are placed in the openings and connected to the conductive wires 108. The conductive wires moveably hold the piezoelectric members 102 within the openings 104 while acting as strain relief to allow the piezoelectric members 102 to actuate, for example, vertically or perpendicularly relative to the planar surface of the carrier 106. The space or gap 110 will allow the air circulation to be created or generated as the piezoelectric members 102 is vibrated. When the carrier 106 is rigid, more air can be generated since the piezoelectric members 102 can vibrate more efficiently.

In one embodiment, the piezoelectric members 102 are arranged in an array of rows and columns as illustrated in FIG. 2. Electrical energy is supplied to each of the piezoelectric members 102 via a serial connection. Such arrangement may provide a greater cooling performance of the piezoelectric members 102 than the sums of the individuals without such arrangement.

Figure 3:
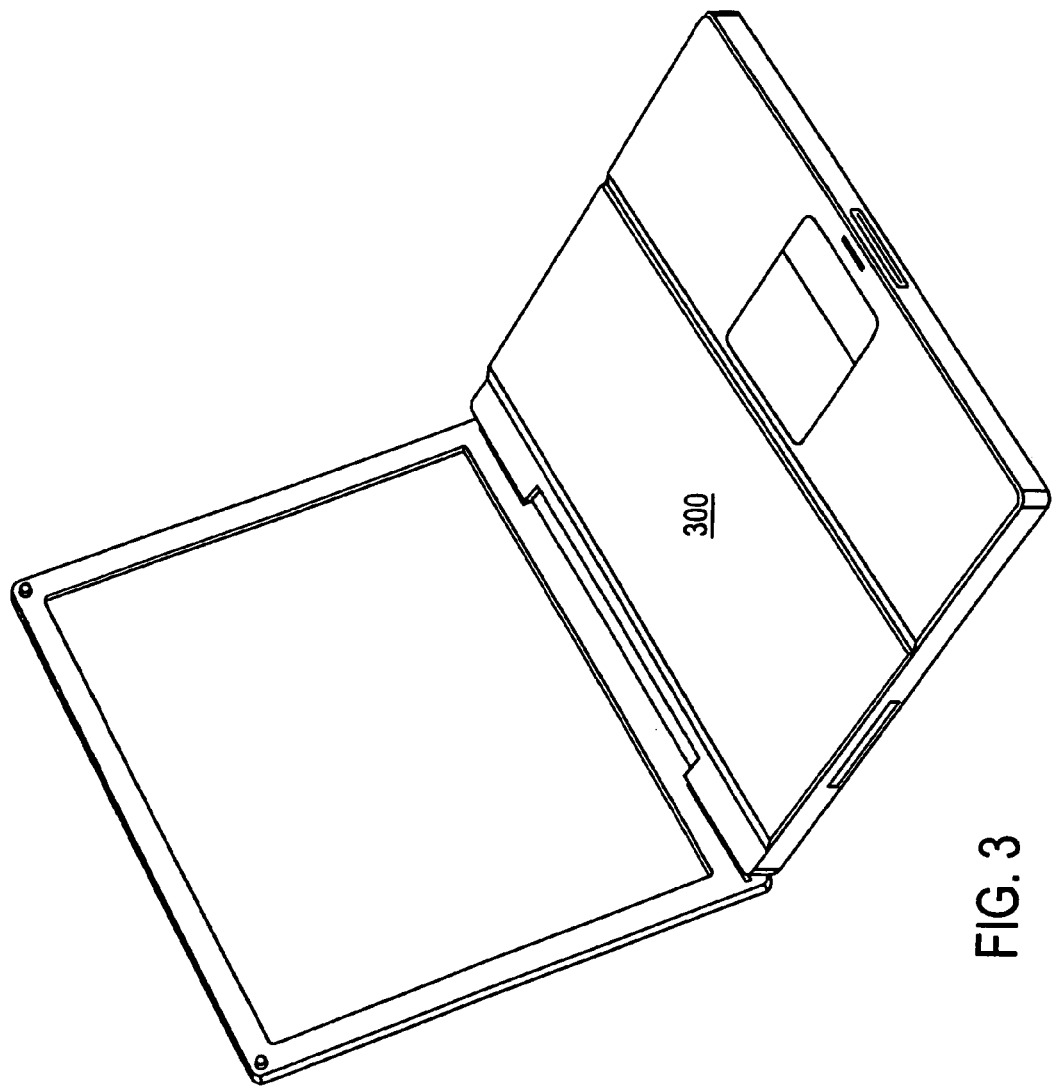
FIG. 3 illustrates a computer system that can benefit from a cooling device of the embodiments of the present invention.

Modern microprocessors employ millions of transistors in internal circuitry and operate at ever increasing speeds. Additionally, other electronic devices also employ millions of transistors in internal circuitry. As a result, the amount of heat generated by modern microprocessor components and various electronic devices has increased significantly. Particular problems arise when these components, and other high heat generating components, are placed within constrained compartments, such as portable computer, laptop, or notebook enclosures. An example of a computer system is a laptop computer system 300 shown in FIG. 3. Electronic devices and microprocessors placed in the computer system 300 are placed in a small and confined space. Conventional fans may not be able to efficiently dissipate the heat generated by the various electronic devices or microprocessors in the computer system 300. The exemplary embodiments of the cooling device of the present invention provide a highly efficient, low power consuming, heat exchanger apparatus that is adaptable to the small confines of such a portable computer enclosure.

Figure 4:
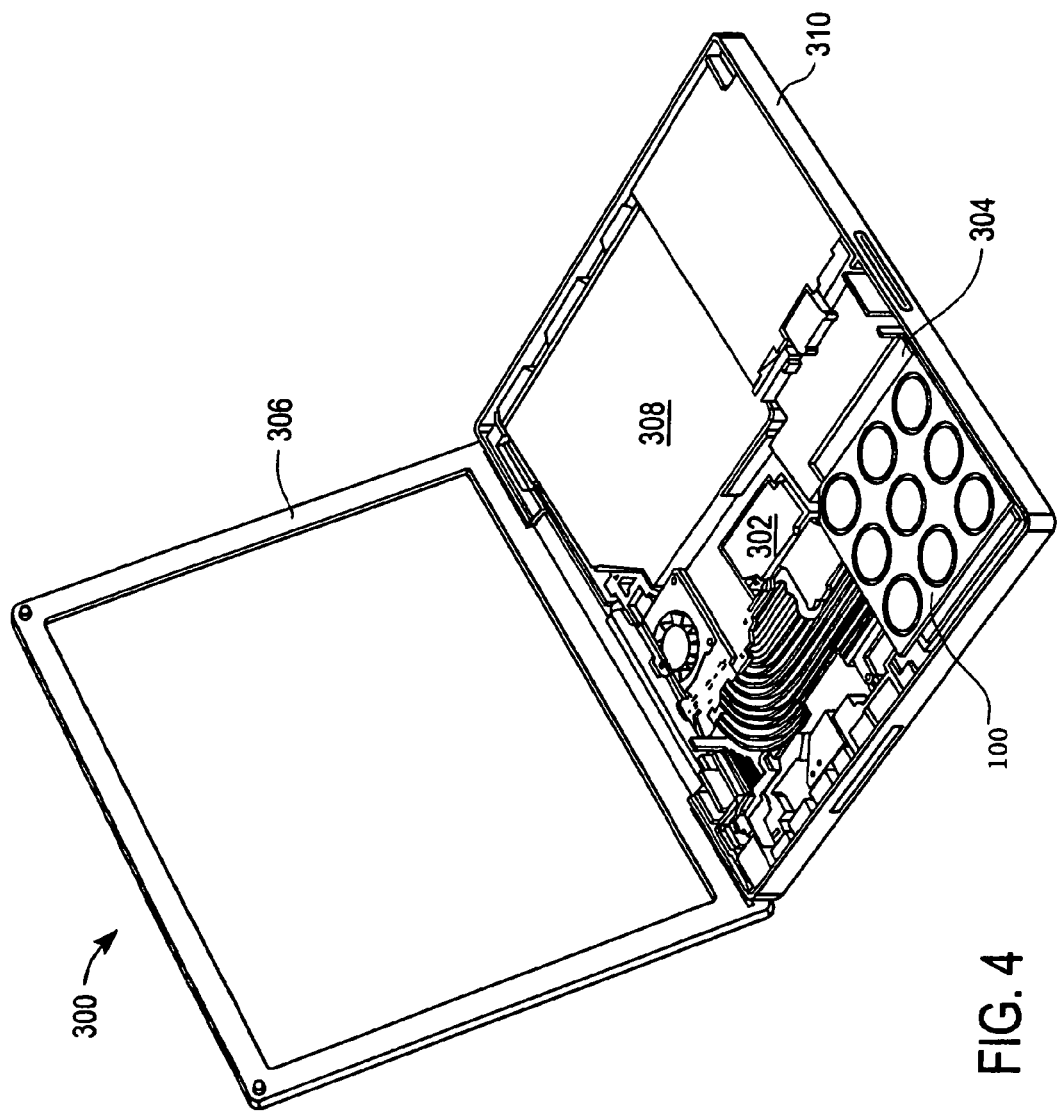
FIGS. 4-6 illustrates a cooling device being incorporated into a computer system to dissipate heat for a hard drive of the computer system.

In one embodiment, a cooling device 100 previously described is incorporated into a notebook computer system 300 as shown in FIG. 4. In one embodiment, the notebook computer system 300 comprises many internal electronic components such as a microprocessor 302, a hard drive 304, and an optical drive 308. The microprocessor 302 performs all of the operations of the computer system 300. For instance, the microprocessor 302 has a set of internal instructions stored in memory, and can access memory for its own use while working. Among many functions, the microprocessor 302 can receive instructions or data through a keyboard (not shown) in combination with another device (mouse, touch pad, trackball, track stick, not shown). The microprocessor 302 can receive and store data through several data storage devices such as the hard drive 304, the optical drive (CD/DVD drive) 308, or a floppy drive (not shown). The microprocessor 302 can display data on a display apparatus 306 of the computer system 300.

Any of the internal electronic components of the computer system 300 can overheat as a result of high heat generated by the components. When any of the components, the particular component may fail and/or the computer system 300 may fail. The cooling device 100 previously described can be incorporated into the computer system 300 to dissipate the heat.

Figure 5:
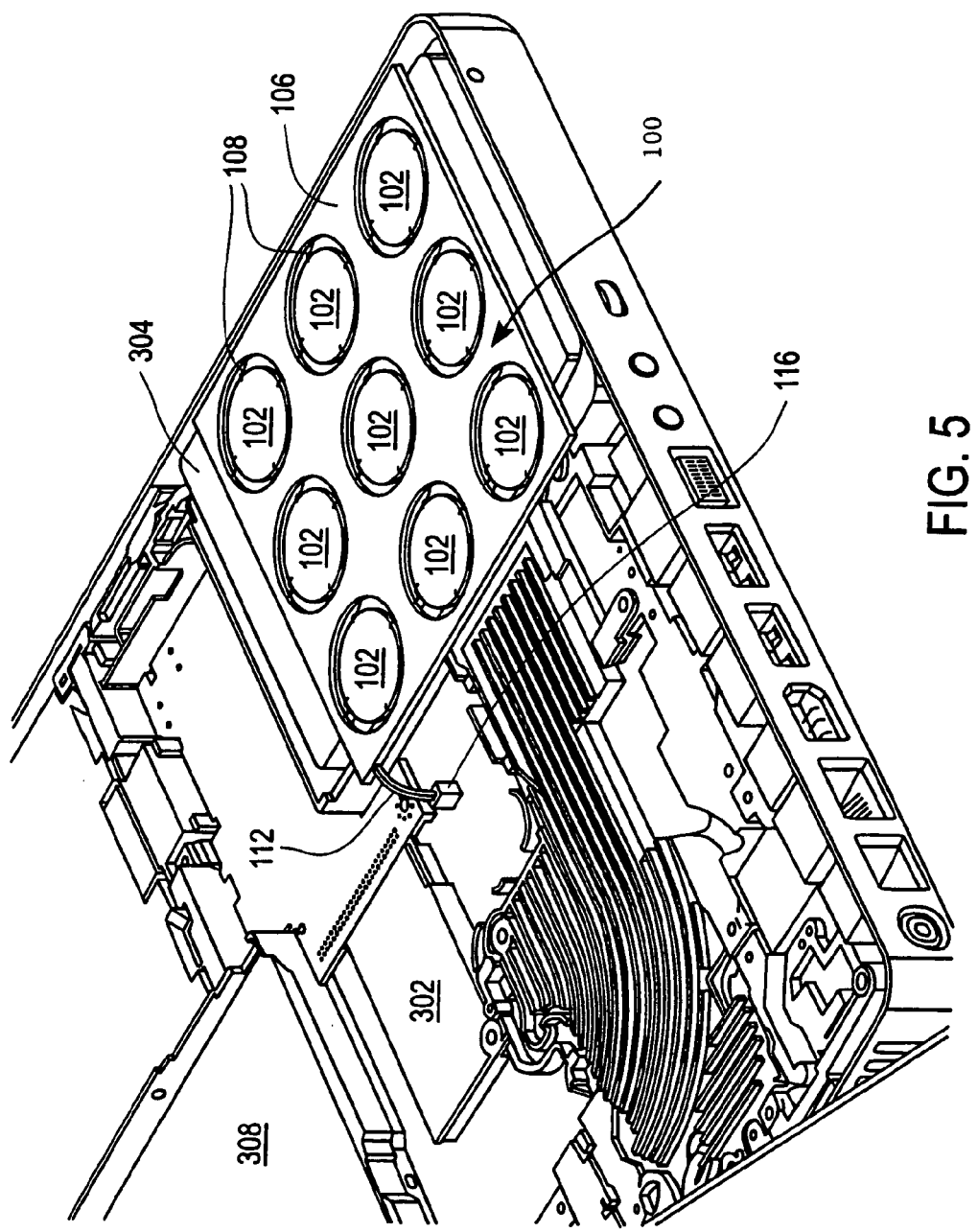

As shown in FIG. 4, the cooling device 100 is placed over the hard drive 304, in one embodiment. The hard drive 304 is mounted on features in the computer system 300, such as a bottom case 310 of the computer system 300. The hard drive 304 can be mounted in a way that allow users to easily remove and/or replace the hard drive 304 as is known in the art. The cooling device 100 can be mounted over the hard drive 304 by being mounted to similar features such as the bottom case 310. In the present embodiment, the cooling device 100 includes the carrier 106 having a plurality of piezoelectric members 102 moveably disposed in the openings 104 of the carrier 106. As previously described, the piezoelectric members 102 are electrically connected by a plurality of conductive wires 108 to an interconnecting member 112 that electrically connect the piezoelectric members 102 to a power source 116 (FIG. 5). When power is supplied, the piezoelectric members 102 actuate or vibrate in a non-audible range as previously discussed. Air circulation is thus generated over the surface of the hard drive 304 and/or the internal surface of a palm rest area of the computer system 300 to dissipate heat. In one embodiment, the cooling device 100 has a size and shape relatively or substantially similar to the hard drive 304 so that the cooling device 100 can cover most of the top surface of the hard drive 304 for optimal heat dissipation. The cooling device 100 needs not cover the entire area of the hard drive 304 for it to function efficiently. The vibration or actuation of the piezoelectric members 102 is sufficient to cause air turbulent over the hard drive 304 for heat dissipation.

Figure 6:
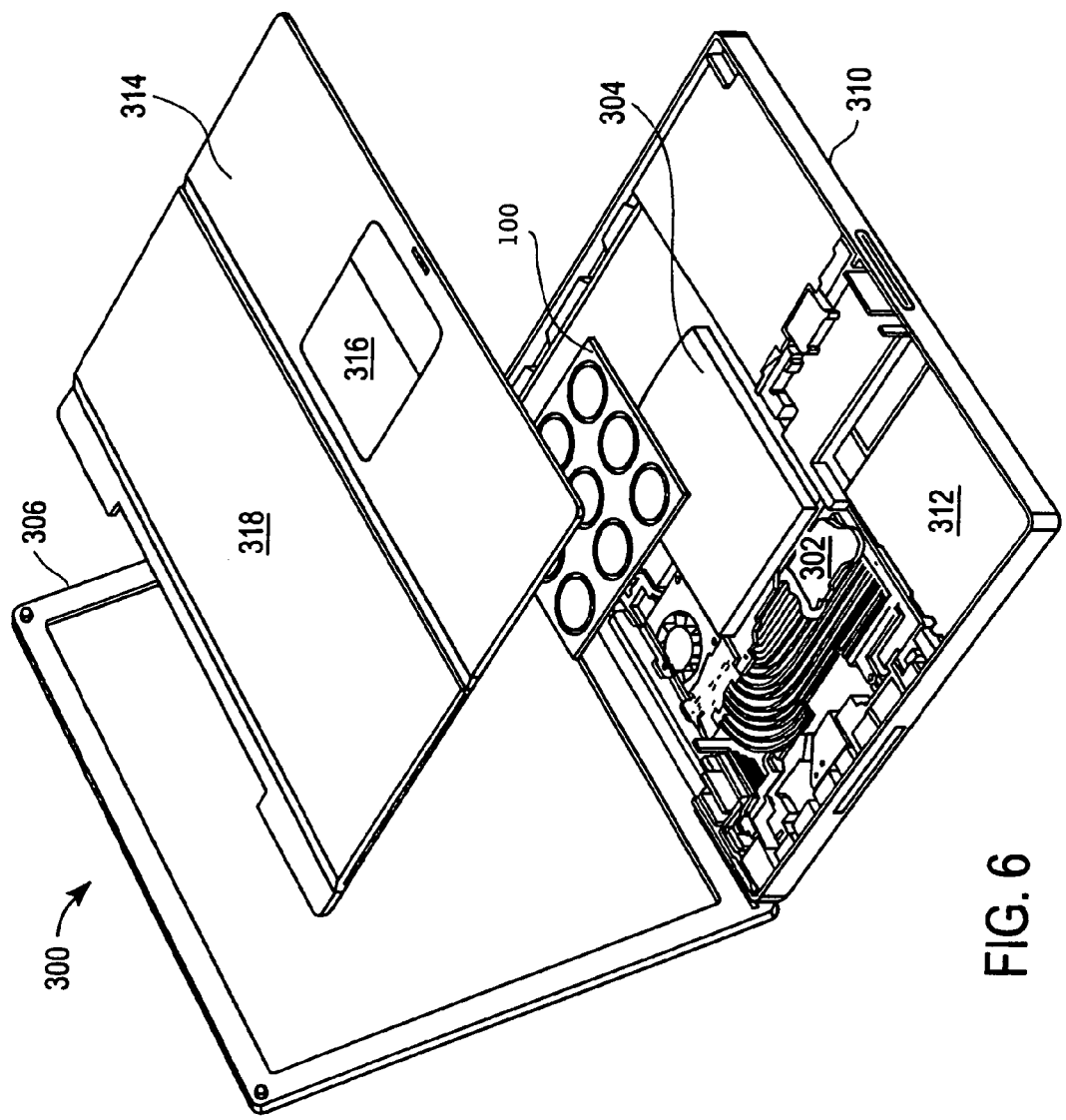

FIG. 6 illustrates a final assembly of the computer system 300 having the cooling device 100 placed over the hard drive 304. In one embodiment, the hard drive 304 is placed into an opening 312 and mounted to the bottom case 310 of the computer system 300. After the hard drive 304 is mounted, the cooling device 100 is placed over the hard drive 304. The cooling device 100 may be fixed to the hard drive 304. Alternatively, the cooling device 100 is placed over the hard drive 304 but is fixedly mounted to another feature of the computer system 300 such as the bottom case 310. In one embodiment, the cooling device 100 is placed over the hard drive 304 in a way that leaves a small gap between the hard drive 304 surface and the cooling device 100 surface. In the present embodiment, the cooling device 100 can be mounted to the bottom case to allow for such gap. After the interconnecting member 112 of the cooling device is connected to a power source (not labeled) of the computer system 300 and after the cooling device 100 is properly mounted over the hard drive 304, a top case 314 for the computer system 300 can be placed over and coupled to the bottom case 310. The top case 314 and the bottom case 310 constitute the enclosure for the computer system 300. Typically, a touch pad 316 and a keyboard 318 are coupled to the top case 314 to complete the computer system 300.

Figure 7:
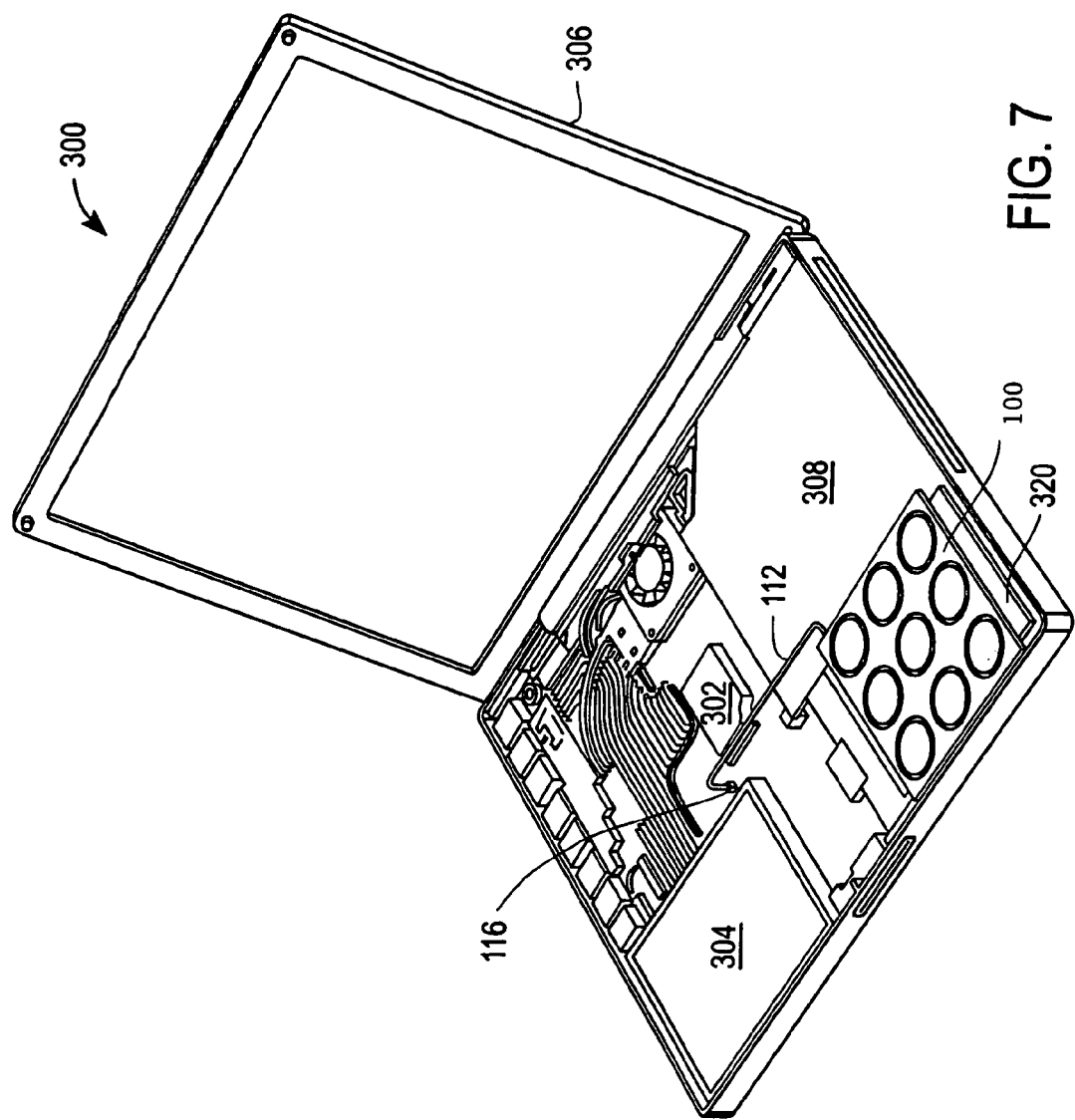
FIGS. 7-9 illustrates a cooling device being incorporated into a computer system to dissipate heat for a battery of the computer system.

The computer system 300 may include one or more cooling devices 100 to cool one or more electronic components. In one embodiment, the cooling device 100 is placed over a battery 320 of the computer system 300 as illustrated in FIG. 7. Similar to the hard drive 304, the battery 320 may generate a great amount of heat, which needs to be dissipated to prevent failure to the battery and/or to the computer system 300.

Figure 8:
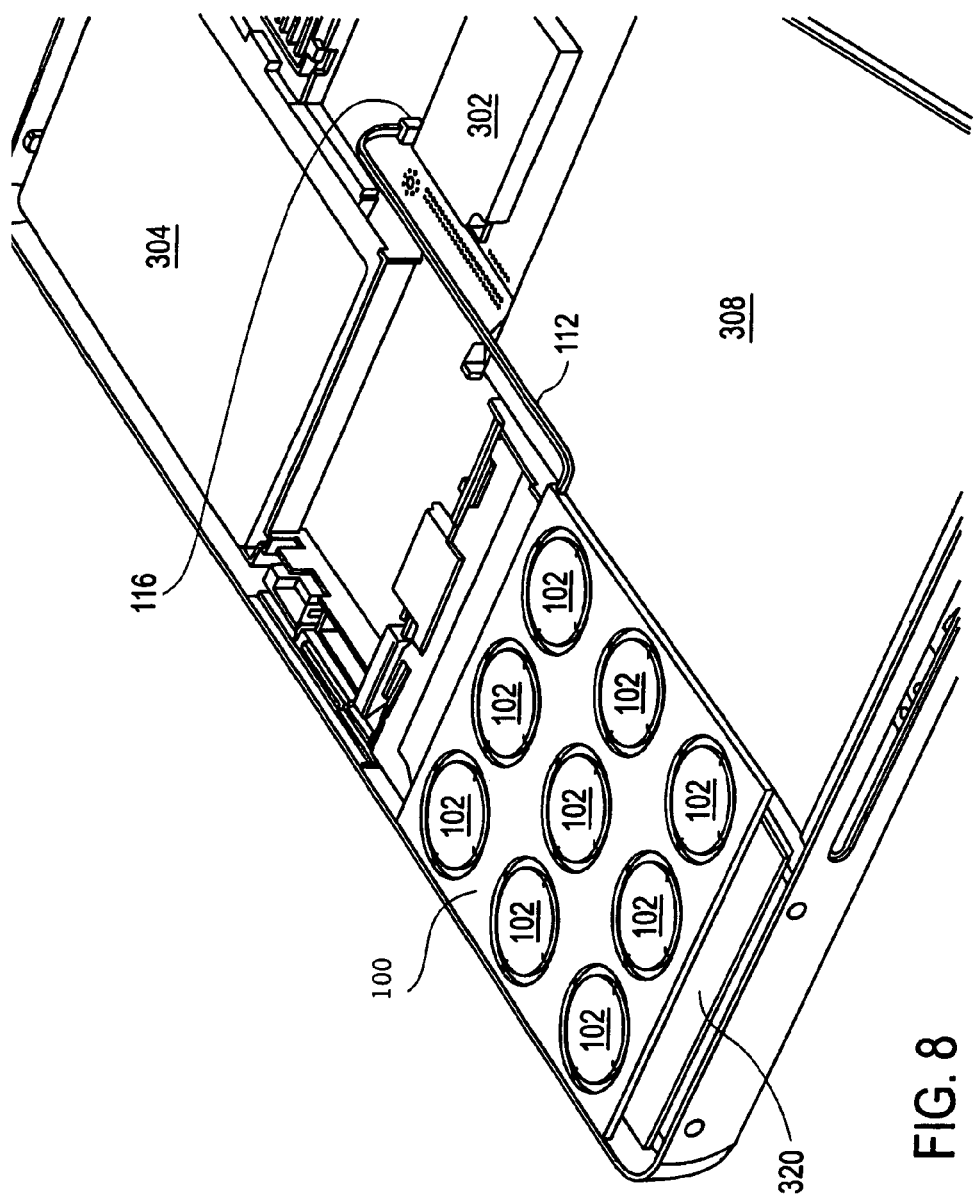

In one embodiment, the battery 320 is mounted on features in the computer system 300, such as a bottom case 310 of the computer system 300. The battery 320 can be mounted in a way that allow users to easily remove and/or replace the battery 320 as is known in the art. The cooling device 100 can be mounted over the battery 320 by being mounted to similar features such as the bottom case 310. In the present embodiment, the cooling device 100 includes the carrier 106 having a plurality of piezoelectric members 102 moveably disposed in the openings 104 of the carrier 106. As previously described, the piezoelectric members 102 are electrically connected by a plurality of conductive wires 108 to an interconnecting member 112 that electrically connect the piezoelectric members 102 to a power source 116 (FIGS. 7-8). When power is supplied, the piezoelectric members 102 actuate or vibrate in a non-audible range as previously discussed. Air circulation is thus generated over the surface of the battery 320 to dissipate heat. In one embodiment, the cooling device 100 has a size and shape relatively or substantially similar to the battery 320 so that the cooling device 100 can cover most of the top surface of the battery 320 for optimal heat dissipation. The cooling device 100 needs not cover the entire area of the battery 320 for it to function efficiently. The vibration or actuation of the piezoelectric members 102 is sufficient to cause air turbulent over the battery 320 for heat dissipation.

Figure 9:
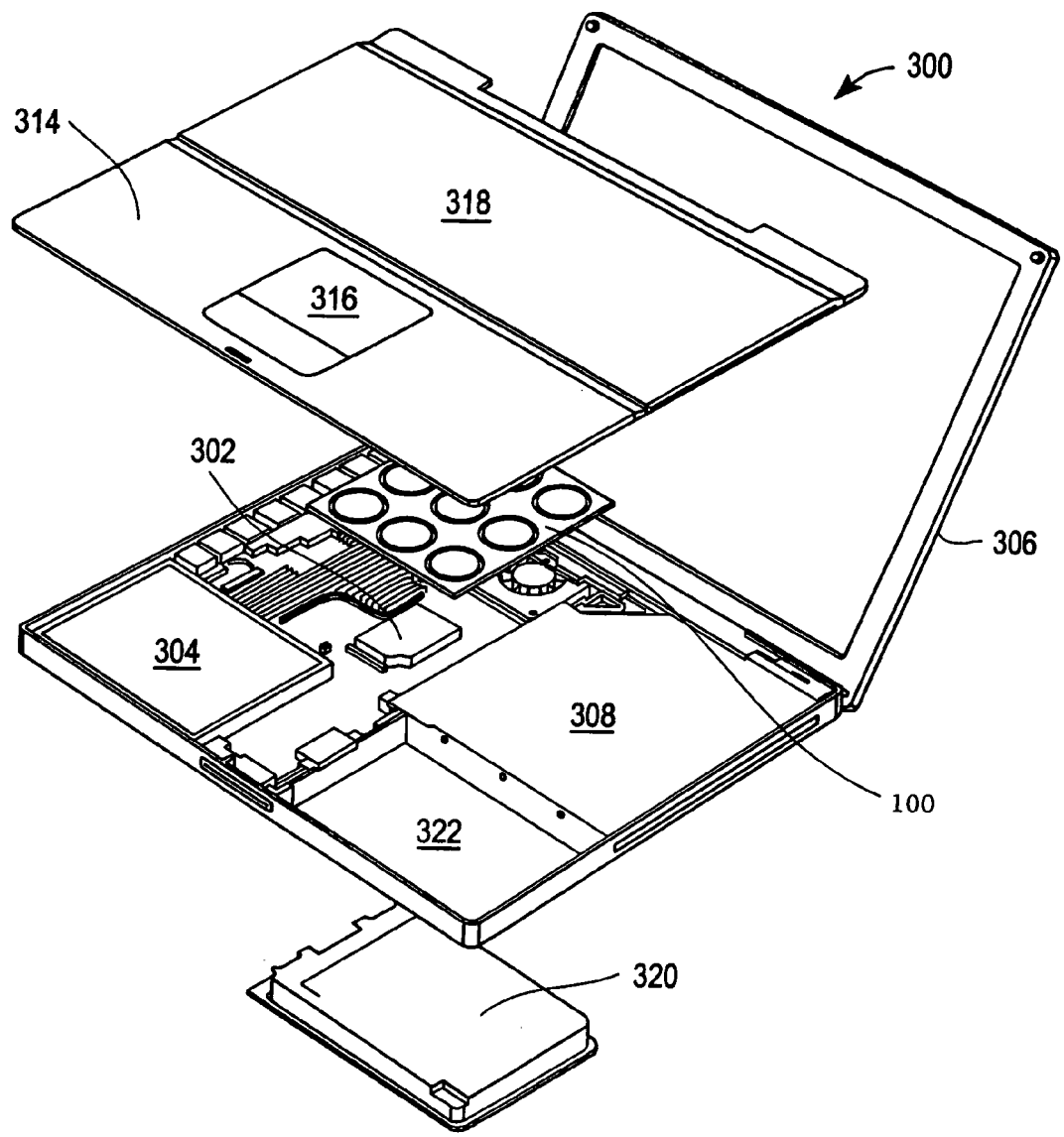

FIG. 9 illustrates a final assembly of the computer system 300 having the cooling device 100 placed over the battery 320. In one embodiment, the battery 320 is placed into an opening 322 and mounted to the bottom case 310 of the computer system 300. After the battery 320 is mounted, the cooling device 100 is placed over the battery 320. The cooling device 100 may be fixed to the battery 320. Alternatively, the cooling device 100 is placed over the battery 320 but is fixedly mounted to another feature of the computer system 300 such as the bottom case 310. In one embodiment, the cooling device 100 is placed over the battery 320 in a way that leaves a small gap between the battery 320 surface and the cooling device 100 surface. In the present embodiment, the cooling device 100 can be mounted to the bottom case 310 to allow for such gap. After the interconnecting member 112 of the cooling device is connected to a power source (not labeled) of the computer system 300 and after the cooling device 100 is properly mounted over the battery 320, a top case 314 for the computer system 300 can be placed over and coupled to the bottom case 310. As previously mentioned, the top case 314 and the bottom case 310 constitute the enclosure for the computer system 300. A touch pad 316 and a keyboard 318 are also coupled to the top case 314 to complete the computer system 300 as previously mentioned.

It is to be noted that other internal components of the computer system 300 may be cooled off using the cooling device 100 similar to previously discussed. For instance, the cooling device may be placed over the optical drive 308, the microprocessor 302, and other integrated circuits of the computer system 300. The cooling device 100 enhances air mixing within the computer system 300 and enhances heat transfer at localized areas where hot spots and high heat accumulation areas can be addressed. As is known, in a notebook computer, the palm rest areas typically get hot after a period of use. This is due to the fact that the hard drive, the battery, and/or other internal components of the computer are placed directly beneath the palm rest areas. Heat generated by these internal components transfer to the palm rest areas and thus heating up the area. Thus, it is necessary to manage the heat dissipation at these areas. The cooling device 100 can efficiently perform such heat dissipation function efficiently using low power consumption while still being able to be placed in a small and confined space available in the notebook computer.

It is to be understood that the cooling device 100 can be adapted for other electronic components and other computer system besides a notebook like computer system. The cooling device 100 can easily be configured (shape, size, thickness, etc . . . ) to be placed over a surface of an internal electronic component (e.g., a central processing unit or a circuit board) of a particular machine or a particular computer system such as a desk top computer. A few examples of electronic devices that can benefit from the cooling device 100 includes a Personal Digital Assistant (PDA), a cellular phone, and a monitor display or a digital music player and a portable power supply.

The exemplary embodiments described herein are provided merely to illustrate the principles of the invention and should not be construed as limiting the scope of the subject matter of the terms of the claimed invention. The specification and drawings are, accordingly, to be regarded in an illustrative rather than a restrictive sense. Moreover, the principles of the invention may be applied to achieve the advantages described herein and to achieve other advantages or to satisfy other objectives, as well.

I claim:

1. A cooling device comprising:
   a carrier having one or more openings;
   a piezoelectric member, moveably disposed in one of the openings;
   a plurality of conductive wires disposed on the carrier and extending into the openings, wherein one or more of the plurality of conductive wires being coupled to the piezoelectric member; and
   an interconnecting member connecting the conductive wires to a power source, wherein when power is supplied, the piezoelectric member vibrates relative to the carrier which causes the piezoelectric member to be the sole provider of an air jet impingement, wherein the air jet impingement is significant enough to dissipate heat generated by an electronic component.

2. The cooling device of claim 1 wherein the piezoelectric member is configured to vibrate at a non-audible frequency.

3. The cooling device of claim 1 wherein the plurality of conductive wires interconnects serially the piezoelectric members.

4. The cooling device of claim 1 wherein the piezoelectric member is configured to vibrate at a non-audible frequency that produces a vibration magnitude less than or equal to about 2 mm.

5. The cooling device of claim 1 wherein the air jet impingement impinges on a surface to create air circulation over the surface.

6. The cooling device of claim 1 wherein the carrier is rigid.

7. The cooling device of claim 1 wherein the plurality of conductive wires are further strain relief members to allow the piezoelectric member to vibrate.

8. The cooling device of claim 1 wherein the carrier is mountable to an electronic device to provide heat dissipating for the electronic device.

9. The cooling device of claim 1 wherein the carrier is mountable to an electronic device of a computer system to provide heat dissipation for the electronic device of the computer system.

10. The cooling device of claim 1 wherein the piezoelectric member is configured to move in a substantially perpendicular direction to a surface of the carrier and wherein the piezoelectric member defines a plane which is parallel with the surface's plane and wherein the one or more openings are parallel with the plane.

11. The cooling device of claim 1 wherein the cooling device includes more than one piezoelectric members, each of the piezoelectric members is disposed within one of the openings.

12. The cooling device of claim 11 wherein all of the piezoelectric members disposed in the carrier vibrate substantially at the same rate and substantially at the same magnitude when power is supplied to the conductive wires.

13. The cooling device of claim 1 the piezoelectric member is one of a disc member, a strip member, or a beam member.

14. A computer system comprising:
   an electronic component disposed within an enclosure case;
   a cooling device placed over a surface of an electronic component of the computer system, the cooling device further comprises a carrier having a plurality of openings, a plurality of piezoelectric members each moveably disposed in one of the openings of the carrier, a plurality of conductive wires disposed on the carrier and extending into the openings, wherein the plurality of conductive wires are coupled to the plurality of piezoelectric members; and an interconnecting member connecting the plurality of conductive wires to a power source, wherein when power is supplied, the piezoelectric members vibrate relative to the carrier which causes the piezoelectric members to be the sole providers of an air jet impingement to dissipate heat generated by the electronic component.

15. The computer system of claim 14 wherein the electronic component includes any one of an integrated circuit chip, a central processing unit, a hard drive, a battery, and a graphic controller card.

16. The computer system of claim 15 further comprises a display apparatus coupled to the enclosure case and controlled at least in part by the graphic controller chip.

17. The computer system of claim 15 wherein the computer system is a notebook computer.

18. The computer system of claim 14 wherein the piezoelectric members are configured to vibrate at a non-audible frequency.

19. The computer system of claim 14 wherein the piezoelectric members are configured to vibrate at a non-audible frequency that produces a vibration magnitude less than or equal to about 2 mm.

20. The computer system of claim 14 wherein the air jet impingement impinges on a surface to create air circulation over the surface of the electronic component.

21. The computer system of claim 14 wherein the carrier is rigid.

22. The computer system of claim 14 wherein the plurality of conductive wires are further strain relief members to allow the piezoelectric members to vibrate.

23. The computer system of claim 14 wherein the carrier is mountable to the electronic component to provide heat dissipating for the electronic component.

24. The computer system of claim 14 wherein the piezoelectric members are configured to move in a substantially perpendicular direction to a surface of the carrier and wherein the piezoelectric members are disposed in a plane which is parallel with the surface's plane and wherein the openings are parallel with the plane.

25. The computer system of claim 14 wherein the piezoelectric members vibrate substantially at the same rate and substantially at the same magnitude when power is supplied to the plurality of conductive wires.

26. A method to dissipate heat from an electronic component comprising:
    placing a carrier having a plurality of piezoelectric members disposed therein over a surface of the electronic component where heat is generated;
    wherein the piezoelectric members are connected through a plurality of conductive wires disposed through the carrier and wherein the piezoelectric members are configured to vibrate relative to the carrier when power is supplied to the piezoelectric members; and
    supplying power to the piezoelectric members, wherein the supplying of power causes the piezoelectric members to be the sole providers of an air jet impingement that impinges on the surface of the electronic component to circulate air, wherein the air jet impingement is significant enough to dissipate heat generated by an electronic component.

27. The method of claim 26 further comprises configuring the piezoelectric members so that the piezoelectric members vibrate at a non-audible frequency when power is supplied.

28. The method of claim 26 further comprises configuring the piezoelectric members so that the piezoelectric members vibrate at a non-audible frequency that produces a vibration magnitude less than or equal to about 2 mm when power is supplied.

29. The method of claim 26 further comprises fixedly mounting the wherein the carrier to the electronic component.

30. The method of claim 26 further comprises placing the electronic component within a computer system.

31. The method of claim 26 further comprises configuring the piezoelectric members so that the piezoelectric members vibrate in a substantially perpendicular direction to a surface of the carrier and wherein the piezoelectric members are disposed in a plane which is parallel with the surface's plane and wherein the openings on the surface are parallel with the plane.

32. The method of claim 26 wherein all of the piezoelectric members vibrate substantially at the same rate and substantially at the same magnitude when power is supplied.

33. A computer system comprising:
    an electronic component disposed within an enclosure case;
    a cooling device placed within the enclosure case which provides a vertical space of only about 2 mm for the cooling device of the computer system, the cooling device further comprises a carrier having a plurality of openings formed in a surface of the carrier, a plurality of piezoelectric members each moveably disposed relative to the openings of the carrier and each defining a plane which is parallel with a plane of the openings and parallel with the surface, a plurality of conductive wires disposed on the carrier and coupled to the plurality of piezoelectric members; and
    an interconnecting member connecting the plurality of conductive wires to a power source, wherein when power is supplied, the piezoelectric members vibrate relative to the carrier which causes the piezoelectric members to be the sole providers of an air jet impingement to dissipate heat generated by the electronic component.

34. The computer system of claim 33 wherein the electronic component includes any one of an integrated circuit chip, a central processing unit, a hard drive, a battery, and a graphic controller card.

35. The computer system of claim 33 further comprises a display apparatus coupled to the enclosure case and controlled at least in part by the graphic controller chip.

36. The computer system of claim 33 wherein the computer system is a notebook computer.

* * * * *